United States Patent Office 3,294,732
Patented Dec. 27, 1966

3,294,732
METHOD OF CURING ORGANOPOLYSILOXANES WITH THE REACTION PRODUCT OF DIETHANOLAMINE AND A HYDROCARBONOXY-SILICON COMPOUND
Siegfried Nitzsche, Manfred Wick, and Ernst Wohlfarth, all of Burghausen, Bavaria, Germany, assignors to Wacker-Chemie, G.m.b.H., Munich, Bavaria, Germany
No Drawing. Filed Oct. 28, 1964, Ser. No. 407,226
Claims priority, application Germany, Oct. 31, 1963, W 35,549
8 Claims. (Cl. 260—37)

This invention relates to a novel organosilicon elastomer and more particularly to a novel room temperature vulcanizing rubber stock based on siloxane polymers.

The discovery, development and commercial exploitation of silicone rubber stocks capable of vulcanizing and curing at room temperature has recently occurred within a relatively short period of time. Several "systems" have been introduced for effecting the vulcanization of silicone rubber at room temperature. One of the vulcanization system employed mixtures of diorganosiloxane polymers with certain alkoxysilanes and/or alkyl polysilicates together with organic amines such as di-n-butylamine. However, the amines hitherto employed as condensation catalysts are frequently objectionable because of disturbing odor and/or toxicity.

It is an object of this invention to introduce a novel room temperature vulcanizing rubber stock based on organosiloxane polymers. It is a further object of this invention to introduce a silicone rubber stock which firmly adheres to glass, metal and other base materials after curing. It is a further object to introduce a novel curing system for silicone rubber stocks. It is a further object to introduce a non-toxic amine cure system for RTV silicone rubber stocks free of objectionable odor. Other objects and advantages of this invention are detailed in or will be apparent from the description and claims following.

This invention is a method of preparing organopolysiloxane elastomers comprising admixing (a) an organopolysiloxane of the average general formula $$(HO)_x(R_ySiO_{4-y/2})_nH$$

where each R is a monovalent hydrocarbon or halogenohydrocarbon radical or a cyanoalkyl radical, $x$ has an average value of from 0.99 to 1.01, $y$ has an average value of from 1.99 to 2.01, the sum of $x+y$ is 3 and $n$ is an integer having a value of at least 1, the organopolysiloxane having a viscosity of at least 25 cs. at 25° C., and (b) the reaction product of (1) a hydrocarbonoxy-silicon compound containing in each molecule at least 3 hydrocarbonoxy groups of the formula R′O— bonded to silicon atoms through SiOC linkage where each R′ is a monovalent hydrocarbon radical or a radical composed of carbon atoms, hydrogen atoms and oxygen atoms present as ether linkages and (2) diethanolamine.

The siloxane polymers employed as the basic ingredient herein are hydroxyl endblocked, linear, essentially diorgano-substituted siloxanes. The polymer chain consists essentially of $R_2SiO$ units but minor amounts (i.e., less than 2 mol percent) of $RSiO_{3/2}$, $R_3SiO_{1/2}$ and $SiO_{4/2}$ units can be tolerated so long as the R/Si ratio remains in the range 1.99/1 to 2.01/1. The endblocking units in the siloxane polymer consist essentially of units of the formula $HO(R)_2SiO_{1/2}$ but the presence of minor amounts of $R_3SiO_{1/2}$ and $(HO)_2RSiO_{1/2}$ units can be tolerated so long as the average ratio of HO/Si in the endblocking units remains in the range of 0.99/1 to 1.01/1. These polymers are exemplified in many patents such as U.S. Patents Nos. 3,127,363, issued March 31, 1964; 3,082,526 and 3,082,527, issued March 26, 1963; 3,070,566 issued December 25 1962; 3,065,194, issued November 20, 1962, and 2,843,555 issued July 15, 1958. A preferred polymer has the general formula

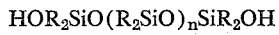

The operable siloxane polymers are soluble in benzene and other common organic solvents and can range from thin fluids having viscosity as low as 25 cs. at 25° C. up to gum-like polymers of viscosity exceeding 1,000,000 cs. at 25° C. Commercial products based on this system are preferably fluid rather than gum-like hence viscosities ranging from 100 to 200,000 cs. at 25° C. are preferred and the best results are achieved with siloxane polymers having viscosity within the range from 200 to 20,000 cs. at 25°C.

The siloxane polymers can be homopolymers wherein each unit has the same R substituents as in a 3,3,3-trifluoropropylmethylsiloxane or a dimethylsiloxane. Copolymers wherein different units are differently substituted are also operable. The presence of some silcarbane linkages (i.e., silicon atoms linked by divalent hydrocarbon radicals) is also permitted. Of course, mixtures of siloxane polymers each satisfying the average general formula can be employed.

The substituents represented by R are monovalent radicals bonded to silicon through C—Si bonding and include alkyl radicals such as methyl, ethyl, propyl, butyl, dodecyl, octadecyl and myricyl radicals; alkenyl radicals such as vinyl, allyl and hexenyl radicals; cycloalkyl radicals such as cyclobutyl, cyclopentyl and cyclohexyl radicals; cycloalkenyl radicals such as cyclopentenyl and cyclohexenyl radicals; aryl radicals such as phenyl, xenyl, naphthyl and phenanthryl radicals; aralkyl radicals such as benzyl, β-phenylethyl, and xylyl radicals; alkaryl radicals such as tolyl, ethylphenyl and methylphenyl radicals; halogenohydrocarbon radicals such as chloromethyl, trifluorovinyl, chlorophenyl, 3,3,3-trifluoropropyl, bromophenyl, α,α,α-trifluorotolyl, pentafluorobutyl, bromoxenyl, chlorotrifluorocyclobutyl, chlorocyclohexyl, and iodophenyl radicals, and cyanoalkyl radicals such as cyanoethyl, cyanopropyl, cyanobutyl, cyano-n-propyl, cyanooctadecyl radicals, the most preferred cyanoalkyl radicals being cyano-substituted on the carbon atom ω to the silicon atom.

The commercially available siloxane polymers which are generally preferred herein do not contain significant proportions of R groups having greater than 19 carbon atoms per radical. Further, the R groups bonded to the terminal silicon atoms can be branched but it is preferred that such groups be free of branching on the carbon atom in the α-position relative to the silicon atom. The best elastomers are obtained when at least 50 percent of the substituents represented by R are methyl, ethyl, propyl or butyl radicals with methyl radicals being most preferred. The most interesting and commercially attractive siloxane polymers have R groups selected from methyl, ethyl, propyl, phenyl, vinyl and 3,3,3-trifluoropropyl radicals.

Having described the siloxane polymer which forms the major ingredient herein, we turn to the second required ingredient which is the reaction product of (1) certain organosilicon compounds having R′O substituents and (2) diethanolamine. The silicon compound reactant (1) is preferably a silane of the general formula $$R_mSi(OR')_{4-m}$$

where R is as above defined, $m$ is 0 or 1 and R′ is a monovalent radical which can be a hydrocarbon radical or a halogenohydrocarbon radical as defined for R above and in addition R′ can be a monovalent radical composed of carbon atoms, hydrogen atoms and oxygen atoms which are present as ether linkages (i.e., —C—O—C— linkages). Also preferred are liquid partial hydrolyzates of the defined silanes, these hydrolyzates being siloxanes of the average unit formula $$R_m(R'O)_nSiO_{\frac{4-m-n}{2}}$$

where $m$ is 0 or 1, $n$ is 1, 2 or 3 and $m+n$ is 3 or less.

The operable silicon compounds having R'O groups include orthosilicates, $(R'O)_4Si$; organotrihydrocarbonoxy silanes, $RSi(OR')_3$; organopolysilicates, $$(R'O)_3SiO[(R'O)_2SiO]_zSi(OR')_3$$

where $z$ is any integer; polyfunctional monoorganosiloxanes, $(R'O)_2RSiO[(R'O)RSiO]_zSiR(OR')_2$ and various combinations, mixtures and variations of the foregoing, the primary requirement being that each molecule of the silicon compound which is reactant (1) in ingredient (b) herein must contain at least 3 R'O groups bonded to silicon, [e.g., a polymer of the general formula $$(R'O)_3SiO[R_2SiO]_zSi(OR')_2R$$

would be operative herein].

The substituent R' bonded to Si through an oxygen atom can be any of the monovalent radicals defined for R above. In addition, R' can contain ethereal oxygen atoms as exemplified by the general formula $$R''(OCH_2CH_2)_a-$$

wherein R'' is a monovalent hydrocarbon radical and $a$ is 1, 2 or 3 such as $CH_3(CH_2)_3OCH_2CH_2-$, $$CH_3(CH_2)_3(OCH_2CH_2)_2-, \ CH_2=CHCH_2OCH_2CH_2-$$
$$C_2H_5OCH_2CH_2-, \ C_2H_5(OCH_2CH_2)_2-$$
$$C_2H_5(OCH_2CH_2)_3-, \ CH_3OCH_2CH_2-$$

and $C_6H_5OCH_2CH_2-$. Preferably R'' contains less than 5 carbon atoms.

Specific examples of the silicon compounds operable as reactant (1) in ingredient (b) herein include tetramethoxy-, tetraethoxy-, tetra-n-propoxy- and tetraisopropoxy silanes as well as various tetraamyloxy silanes, tetraallyloxy-, tetra-2-n-pentenyloxy, ethyltriisopropoxy-, tetra-n-hexyloxy-, methyl-tri-n-hexyloxy-, tetra-n-butoxy-, ethyl-tri-n-butoxy-, vinyl-trimethoxy-, 3,3,3-trifluoropropyltrimethoxy-, β-cyanoethyl-trimethoxy-, phenyltrimethoxy-, n-octadecyltrimethoxy-, n-propyltri-n-butoxy-, methyltriethoxy-, and methyl-trimethoxy-, ethyl-trimethoxysilanes as well as silanes of the formulae $$Si(OCH_2CH_2OCH_3)_4, \ CH_3Si(OCH_2CH_2OCH_3)_3$$
$$Si(OCH_2CH_2OC_2H_5)_4, \ Si(OCH_2CH_2OCH=CH_2)_4$$
$$Si(OCH_2CH_2OC_4H_9)_4, \ C_6H_5Si(OCH_2CH_2OCH_3)_3$$
$$CH_2=C(CH_3)CH_2Si(OCH_2CH_2OCH_3)_3$$

and

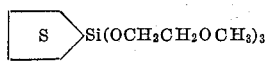

The silanes set forth in the preceding paragraph can be polymerized by partial hydrolysis replacing about 1–2 OR' groups per Si with an —OH group and condensing the —OH groups to form siloxane linkages. The resulting siloxane polymers have residual —OR' groups bonded to Si as in polysilicates and in organoalkoxysiloxanes. The operable hydrolyzates of said silanes preferably contain at least 0.5 OR' groups per Si and not more than 10 Si atoms per molecule and the best results are obtained with partial hydrolyzates containing at least 2 OR' groups per Si and not more than 5 Si atoms per molecule. Specific examples of these partial hydrolyzates are methyl- and ethylpolysilicates, hexaethoxydisiloxane, n-propyl and isopropyl polysilicates and $[(CH_3OCH_2CH_2O)_3Si]_2O$.

Optionally, the silicon compound containing OR' groups can be a finely divided silica esterified with an alcohol of the formula R'OH where R' is as above defined. Such treated silicas can introduce the required R'OSi groups and a filler for the rubber as one ingredient.

The preparation of the esterification products is described in the art particularly in United States Patents Nos. 2,657,149, issued October 27, 1953; 2,680,696, issued January 8, 1954; 2,727,876, issued December 20, 1955; 2,736,668, and –669, issued February 28, 1956 and 2,739,-074 and –075, issued on March 20, 1956. The esterification can be carried out, for example, by heating a silica having a surface area in the range from 1 to 900 square meters per gram with any alcohol of the formula R'OH to at least 100° C. in the presence of a strong base or a strong acid. The esterified silica contains at least 100 R'O-groups per 100 millimicrons of silica. Such esterified silicas are commercially available and typically contain as low as 88% by weight of silica with up to 12% by weight n-butoxy groups esterified therewith.

The silicon compound (1) is reacted with (2) diethanolamine which is also known as di(2-hydroxyethyl)amine. The reactants (1) and (2) are employed in molar proportions of from 1:1 to 100:1 which is a weight ratio of about 5:1 to 500:1. The reactants are mixed at room temperature and the reaction may be carried out at room temperature. However, the reaction can be accelerated by heating up to 200° C. The reaction at room temperature goes essentially to completion in from one day to three months. When using the silanes of the formula $R_mSi(OR')_{4-m}$ and their defined partial hydrolyzates, the reaction with diethanolamine first produces an oil which separates from the reaction mass or a gel within the mass. As the reaction proceeds the oil or gel so formed again dissolves in the reaction mass and when this redissolving is completed, the reaction is terminated. Termination of the reaction can also be determined by testing whether an alcohol of the formula R'OH can be distilled from the mixture. When the alcohol can no longer be distilled, the reaction is completed. However, the alcohol produced during the reaction does not require removal prior to admixture of the reaction product (b) with the siloxane polymer (a).

The reaction product (b) prepared from silicon compound (1) and diethanolamine (2) is mixed with siloxane polymer (a) shortly before the mass is molded. The siloxane polymer (a) can contain various additives widely employed in silicone rubber stocks. The most commonly employed additive is any filler normally found in silicone rubber stocks, but other additives in standard proportions can be present. The mixture of siloxane polymer (a) and reaction product (b) cures spontaneously at room temperature. The cure rate can be accelerated by heating if desired. The mixture of siloxane polymer (a) and reaction product (b) should be such that the silicone compound (1) containing —OR' groups is present in proportion of from 0.5 to 15 parts by weight per 100 parts by weight siloxane polymer (a) with best results achieved with from 1.5 to 6 parts by weight of silicon compound (1).

Examples of the common additives for organopolysiloxane elastomers are those for reducing permanent deformation, solvents, pigments, solvent-soluble dyes, perfumes, oxidation inhibitors, heat stabilizers, flame inhibitors, agents for protection against light, diorganopolysiloxanes endblocked by triorganosiloxy groups, for example, a dimethylpolysiloxane endblocked by trimethylsiloxane units, 350 cs./25° C., as plasticizer, as well as reinforcing and non-reinforcing fillers. If desired, the organopolysiloxanes (a) can also be mixed with 0.01 to 5%, calculated on the weight of organopolysiloxane (a) of organic peroxides commonly employed as vulcanizing agents for silicone rubber such as benzoyl peroxide and 2,4-dichlorobenzoyl peroxide in addition to the other named additives, especially when some (especially 0.1 to 10 mol percent) of the R radicals are alkenyl groups, especially vinyl groups.

Examples of reinforcing fillers are soot, silicas obtained pyrogenically in the gas phase maintaining the structure of dehydrated silica hydrogels, i.e., so-called silica aerogels, and precipitated silicas with a surface of at least 50 m.²/g. These fillers can have organosilyl groups at their surface if desired. Non-reinforcing fillers are, for example, calcium carbonate, finely divided silicas with a surface of less than 50 m.$^2$/g., such as diatomaceous earth and quartz flour, finely divided silicates such as talcum and zirconium silicate, gypsum acetyl cellulose in powder, fiber or flock form, metal powder such as aluminum or nickel powder, or metal oxides obtained by common precipitation, such as titanium dioxide, ferric oxide, aluminum oxide and zinc oxide. The usual fibrous fillers common to organopolysiloxane elastomers, such as asbestos and glass fibers can be used. Mixtures of these fillers can also be used. Non-reinforcing fillers are preferred. The fillers are preferably employed in quantities of 5 to 200 parts, especially 20 to 150 parts, always calculated on 100 parts by weight of organopolysiloxane (a).

As has been noted, the organopolysiloxane elastomers will adhere tenaciously to glass and metals, such as steel, copper, brass, and aluminum even without prior priming of the glass or the metals. The method of the present discovery is therefore very suitable for combining these materials as well as for carrying out the work of sealing and pouring, for instance in the building industry, in planes and in automobiles. The method according to the present discovery is generally suitable for all applications in which organopolysiloxane-based materials hardening to elastomers at room temperature are commonly incorporated, for example for the preparation of protective coatings, electrical and thermal insulation, for encapsulating electronic installations, for taking impressions, for finishing textiles as well as for preparing sheets, molds and laminates.

In the following examples the work was always done at room temperature unless otherwise stated. The examples do not limit the scope of the invention which is defined in the appended claims. The examples merely assist those skilled in the art to practice this invention.

*Example 1*

2. g. of diethanolamine were mixed with 6 ml. hexaethoxydisiloxane. The emulsion thus obtained gelled after about ½ hour. This gel had converted back into a fluid after standing for four days.

6 g. of the reaction product so prepared was stirred into a mixture of 100 g. of a dimethylpolysiloxane containing one hydroxyl group on each terminal silicon and having a viscosity of 20,000 cs. at 25° C. and 50 g. of quartz flour. The mixture thus obtained vulcanized within 24 hours to an elastomer with a shore hardness of 33.

*Example 2*

5 g. diethanolamine were mixed with 50 ml. ethylpolysilicate (SiO$_2$ content: 34% by weight). From the emulsion thus obtained a brown oil separated out after 12 hours. The brown oil went back into solution after 24 hours.

8 g. and 12 g. of the light amber colored fluid thus obtained were stirred into two mixtures, each consisting of 100 g. of a dimethylpolysiloxane containing one hydroxyl group in each terminal silicon and having a viscosity of 1,000 cs. at 25° C. and 100 g. quartz flour. The mixtures thus obtained were applied to structural steel and a glass plate, each in a film 1.5 mm. thick. The mixture containing 8 g. of the fluid hardened to an elastomer within about 8 hours, the mixture containing 12 g. of the fluid vulcanized within about 4 hours. The adherence of the coatings to the substrates was excellent. By way of comparison an elastomer which was prepared in identical fashion with the exception that instead of the 8 g. of the above amine and silicic acid fluid, a mixture of 2 ml. dibutyltin dilaurate and 6 ml. ethylpolysilicate (SiO$_2$ content: 34% by weight) was used, would adhere neither to the glass nor to the structural steel.

*Example 3*

12 g. of the light amber fluid prepared as described in the first paragraph of Example 2, were stirred into a mixture of 100 g. of a dimethylpolysiloxane having one hydroxyl group on each terminal silicon atom and having a viscosity of 1,000 cs. at 25° C. and 100 g. of zirconium silicate. The mass thus obtained was pourable and was applied in films 1.5 mm. thick to a glass plate, to plates of sand blasted structural steel, aluminum, copper and brass, as well as to zinc coated sheets of iron. The films hardened within 12 hours to elastomeric coatings which adhered firmly to the substrates. After 20 hours the coated sheet of sand blasted steel was placed in an air-circulating oven which was heated to 250° C. within 24 hours. After 21 days at 250° C., the coating and its adhesion to the substrate were unchanged.

Elastomers which were obtained in the same manner with the exception that instead of 12 g. of the reaction product of diethanolamine and ethylpolysilicate, the same amount of a mixture of 4 parts by weight di-n-butylamine and 10 parts by volume of ethylpolysilicate or 4 g. of a mixture of one part by volume dibutyltin dilaurate and 3 parts by volume of ethylpolysilicate (SiO$_2$ content: 34% by weight) was used did not adhere to any of the substrates.

*Example 4*

12 g. of the light amber colored fluid prepared as described in paragraph 1 of Example 2 and 5 g. of a mixture of 1 part by volume of dibutyltin dilaurate and 3 parts by volume of ethylpolysilicate (SiO$_2$ content: 34% by weight) were stirred into two mixtures each consisting of 100 g. of a dimethylpolysiloxane having one hydroxyl group on each terminal silicon atom and having a viscosity of 1,000 cs. at 25° C. and 100 g. zirconium silicate. The mixtures were poured out in plates 5 mm. thick, which hardened within about 12 hours. After 7 days the elastomers thus obtained were placed in an air circulating oven which was heated to 250° C. within 24 hours. After 185 days at this temperature, the elastomer prepared according to the present discovery still possessed excellent flexibility, while that prepared with the use of the tin salt was stiff and brittle.

The heat stability was determined during the identical test conditions of two elastomers which were obtained after mixing in 3 g. of the fluid prepared as in paragraph 1 of Example 2, or 3 g. of the above mixture of tin salt and ethylpolysilicate in mixtures, always consisting of 100 g. of a hydroxyl-endblocked dimethylpolysiloxane having a viscosity of 20,000 cs. at 25° C. and 50 parts diatomaceous earth. The results achieved were identical to those obtained in the preceding paragraph.

*Example 5*

Equivalent results were achieved when Example 1 was repeated employing any of the following silicon compounds in place of the hexaethoxydisiloxane: methyltrimethoxysilane, ethyltriethoxysilane, methyltriethoxylsilane, diethoxydimethoxysilane, tetraethoxysilane, tetramethoxysilane, vinyltri-n-butoxysilane, tetramethoxyethoxysilane, phenyltri(ethoxyethoxy)silane, and partial hydrolyzates of such silanes containing less than 10 silicon atoms per molecule.

*Example 6*

Equivalent results are achieved when the Example 2 is repeated employing any of the following siloxanes in place of the dimethylsiloxane; hydroxyl endblocked dimethylsiloxanes of 250 cs., 5,000 cs., 100,000 cs. and 200,000 cs. viscosity:

$(HO)_2C_6H_5SiO[CH_3(CF_3CH_2CH_2)SiO]_{100}Si(CH_3)_2OH$ $HO(CH_3)(CH_2=CH)SiO[CH_3(C_6H_5)SiO]_{10}$
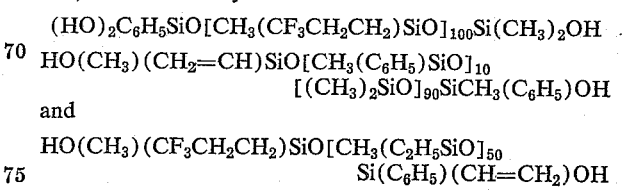

and $HO(CH_3)(CF_3CH_2CH_2)SiO[CH_3(C_2H_5SiO]_{50}$
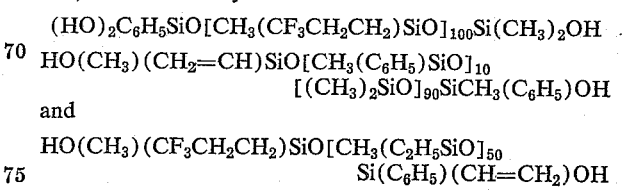

That which is claimed is:

1. A method for preparing organosiloxane elastomers comprising admixing (a) 100 parts by weight of an organosiloxane polymer of the general average formula $$(HO)_x \left( R_y SiO_{\frac{4-y}{2}} \right)_n H$$

where each R is a monovalent radical selected from the group consisting of hydrocarbon radicals, halogenohydrocarbon radicals and cyanoalkyl radicals, $x$ has an average value of from 0.99 to 1.01, $y$ has an average value of from 1.99 to 2.01, the sum of $x+y$ is 3.0, the value of $n$ is at least 1, said polymer having a viscosity in the range from 25 cs. to 200,000 cs. at 25° C. and (b) the reaction product of (1) 0.5 to 15 parts by weight of a silicon compound containing at least 3 silicon bonded OR' groups per molecule where R' is a monovalent radical selected from the group consisting of hydrocarbon radicals and radicals composed of carbon, hydrogen and oxygen atoms present as ether linkages, said silicon compound containing an average of from 1 to 10 inclusive silicon atoms per molecule and (2) diethanolamine the molar ratio of silicon compound (1) to diethanolamine (2) in the reaction product (b) being from 1:1 to 20:1.

2. The method of claim 1 further characterized in that the silicon compound (b) (1) is selected from the group consisting of silanes of the general formula $$R_m Si(OR')_{4-m}$$

where R and R' are as defined in claim 1 and $m$ is 0 or 1, liquid partial hydrolyzates of such silanes and a finely divided silica which has been esterified with an alcohol of the formula R'OH.

3. The method of claim 1 wherein the silicon compound (b)(1) is a tetraalkoxysilane.

4. The method of claim 1 wherein the silicon compound (b)(1) is an alkylpolysilicate of not more than 10 silicon atoms per molecule.

5. A method of preparing organosiloxane elastomers comprising admixing (a) 100 parts by weight of an organosiloxane polymer of the general formula $$HOR_2SiO(R_2SiO)_n SiR_2OH$$

where each R is a monovalent radical selected from the group consisting of hydrocarbon radicals, halogenohydrocarbon radicals and cyanoalkyl radicals, the value of $n$ is at least 1, said polymer having a viscosity in the range from 100 to 200,000 cs. at 25° C. and (b) the reaction product of (1) 0.5 to 15 parts by weight of a monomeric organosilicate of the general formula $$R_m Si(OR')_{4-m}$$

where R is as above defined, $m$ is 0 or 1 and R' is an alkyl radical and (2) diethanolamine the molar ratio of monomeric organosilicate (1) to diethanolamine (2) in the reaction product being from 1:1 to 20:1.

6. The method of claim 5 wherein each R and each R' is a methyl radical.

7. A method of preparing organosiloxane elastomers comprising admixing (a) 100 parts by weight of an organosiloxane polymer of the general formula $$HOR_2SiO(R_2SiO)_n SiR_2OH$$

where each R is a monovalent radical selected from the group consisting of hydrocarbon radicals, halogenohydrocarbon radicals and cyanoalkyl radicals, the value of $n$ is at least 1, said polymer having a viscosity in the range from 100 to 200,000 cs. at 25° C. and (b) the reaction product of (1) 0.5 to 15 parts by weight of a liquid partial hydrolyzate of a silane of the general formula $R_m Si(OR')_{4-m}$ where R is as above defined, R' is an alkyl radical, $m$ is 0 or 1, said hydrolyzate having an average of not more than 10 silicon atoms per molecule and (2) diethanolamine the molar ratio of liquid partial hydrolyzate of silane (1) to diethanolamine (2) in the reaction product (b) being from 1/1 to 20/1.

8. The method of claim 7 wherein each R and each R' is a methyl radical.

References Cited by the Examiner
UNITED STATES PATENTS

| | | | |
|---|---|---|---|
| 2,982,755 | 5/1961 | Kidwell et al. | 260—37 |
| 3,065,194 | 11/1962 | Nitzsche et al. | 260—37 |
| 3,112,538 | 12/1963 | Emblem | 260—488.8 XR |
| 3,133,891 | 5/1964 | Ceyzeriat. | |

MORRIS LIEBMAN, *Primary Examiner.*

ALAN LIEBERMAN, *Examiner.*

J. H. DERRINGTON, *Assistant Examiner.*